United States Patent
Gillard et al.

(10) Patent No.: US 7,118,616 B2
(45) Date of Patent: Oct. 10, 2006

(54) PAINT COMPOSITIONS COMPRISING ESTERS OF ROSIN AND PROCESS OF PRODUCTION THEREOF

(75) Inventors: Michel Gillard, Louvain-la-Neuve (BE); Marcel Vos, Nivelles (BE)

(73) Assignee: Sigma Coatings B.V., Uithoorn (NL)

( * ) Notice: Subject to any disclaimer, the term of this patent is extended or adjusted under 35 U.S.C. 154(b) by 0 days.

(21) Appl. No.: 10/492,766

(22) PCT Filed: Oct. 25, 2002

(86) PCT No.: PCT/EP02/11957

§ 371 (c)(1),
(2), (4) Date: Feb. 10, 2005

(87) PCT Pub. No.: WO03/037999

PCT Pub. Date: May 8, 2003

(65) Prior Publication Data

US 2005/0131099 A1    Jun. 16, 2005

(30) Foreign Application Priority Data

Oct. 30, 2001 (EP) .................................. 01204141

(51) Int. Cl.
C09D 5/16 (2006.01)
C09D 193/04 (2006.01)

(52) U.S. Cl. .................... 106/16; 106/218; 106/236

(58) Field of Classification Search ............. 106/15.05, 106/218, 236, 16
See application file for complete search history.

(56) References Cited

U.S. PATENT DOCUMENTS

| | | | |
|---|---|---|---|
| 4,918,147 A | 4/1990 | Yamamori et al. | |
| 4,962,135 A | 10/1990 | Braeken et al. | |
| 5,112,397 A | 5/1992 | Farmer, Jr. et al. | |
| 5,382,281 A | 1/1995 | Kuo | |
| 5,436,284 A | 7/1995 | Honda et al. | |
| 5,545,823 A | 8/1996 | Kuo et al. | |
| 5,712,275 A | 1/1998 | Van Gestel | |
| 5,767,171 A | 6/1998 | Matsubara et al. | |
| 5,795,374 A * | 8/1998 | Itoh et al. ...................... | 106/16 |
| 6,069,189 A | 5/2000 | Kramer et al. | |
| 6,110,990 A | 8/2000 | Nakamura et al. | |
| 6,248,806 B1 | 6/2001 | Codolar et al. | |
| 6,303,701 B1 | 10/2001 | Isozaki et al. | |
| 6,559,202 B1 | 5/2003 | Fox et al. | |
| 6,710,117 B1 | 3/2004 | Gillard et al. | |
| 6,828,030 B1 * | 12/2004 | Arimura et al. ............. | 428/447 |
| 2003/0162924 A1 | 8/2003 | Vos et al. | |
| 2005/0080159 A1 * | 4/2005 | Omoto et al. ................ | 523/122 |

FOREIGN PATENT DOCUMENTS

| | | | |
|---|---|---|---|
| EP | 0001711 | * | 5/1979 |
| EP | 0 131 621 | | 9/1987 |
| EP | 0 297 505 | | 1/1989 |
| EP | 0 526 441 | | 2/1993 |
| EP | 0 530 205 | | 12/1994 |
| GB | 2 152 947 | | 8/1985 |
| WO | WO 84/02915 | | 8/1984 |

OTHER PUBLICATIONS

The Condensed Chemical Dictionary, Hawley et al, 1974, p. 653.*
J.D. Nicholson, The Analyst, 103, 1224, 193-222 (1978).
M. Lalonde et al., Synthesis, 817-845 (1985).
Duane F. Zinek et al. J. Gas Chromatography 6(3), 158-160 (1968).
CAS Registry No. 514-10-3 record in STN Registry file.
CAS Registry No. 214-14-50-6 record in STN Registry file.
International Preliminary Examination Report for PCT/EP02/11957 no data provided.

* cited by examiner

Primary Examiner—David M. Brunsman
(74) Attorney, Agent, or Firm—Goodwin Procter LLP

(57) ABSTRACT

A paint composition comprising silylesters of rosin. Silylesters of rosin are used in self-polishing antifouling paints alone or in combination with other binder components. A process is also defined for the addition of silylesters to paint compositions.

13 Claims, No Drawings

PAINT COMPOSITIONS COMPRISING ESTERS OF ROSIN AND PROCESS OF PRODUCTION THEREOF

This is a national phase filing of International Application No. PCT/EP02/11957, which was filed on Oct. 25, 2002, and published in English on May 8, 2003 and is entitled to priority of European Patent Application No. 01204141.4 filed Oct. 30, 2001.

The present invention relates to paint compositions, more particularly, it relates to the use of silylesters as binder in self-polishing antifouling paints.

Many existing antifouling paints used for ships to prevent barnacles and other marine life from attaching to the ships' hulls work by slowly leaching metallic compounds into the sea. But studies have shown that these compounds persist in the water, killing sea life, harming the environment and possibly entering the food chain. One of the most effective types of antifouling paint, developed in the 1960s, contains the organotin tributyltin (TBT), which has been proven to cause deformations in oysters and sex changes in whelks.

The International Maritime Organization (IMO), a unit of the United Nations, adopted on 5 Oct. 2001 an International Convention on the Control of Harmful Antifouling Systems at the end of a five-day Diplomatic Conference held in London.

The proposed antifouling convention comes in response to Assembly resolution A.895 (21) Antifouling systems used on ships, adopted by IMO in November 1999, which called on IMO's Marine Environment Protection Committee (MEPC) to develop an instrument, legally binding throughout the world, to address the harmful effects of antifouling systems used on ships).

The resolution calls for a global prohibition on the application of organotin compounds which act as biocides in antifouling systems on ships by 1 Jan. 2003, and a complete prohibition on the presence of organotin compounds which act as biocides in antifouling systems on ships by 1 Jan. 2008.

The harmful environmental effects of organotin compounds were recognized by IMO in 1990, when the MEPC adopted a resolution which recommended that Governments adopt measures to eliminate the use of antifouling paint containing TBT on non-aluminium hulled vessels of less than 25 meters in length and eliminate the use of antifouling paints with a leaching rate of more than 4 micrograms of TBT per day. Some countries, such as Japan, have already banned TBT in antifouling paint for most ships.

There is therefore a need in the art for improved erodable antifouling paint compositions containing no organotin compound, while retaining the good antifouling and self-polishing properties of the tin-containing antifouling paints of the prior art.

Tin-free systems are well known in the art:

Antifouling paints containing rosin and similarly soluble salts thereof have existed for many years. Rosin is slightly soluble in seawater ($8.6 \times 10^{-5}$ mol/L at pH=8.1). Due to its low molecular weight, rosin is blended with another binder to provide an appropriate film-forming performance.

Paints based on a combination of wood rosin with copper- or zinc-pyrithione have been found to thicken or gel unacceptably within a few days. U.S. Pat. No. 5,112,397 (Olin Corp.) discloses paints containing an amine compound or esterified wood rosin to impart desired gelation-inhibition.

EP 289481 and EP 526441 (Sigma Coatings), WO 9744401 (Hempel's) disclose systems based on rosin in combination with a film forming binder. However, the coatings produced in accordance with these specifications suffer from the technical problem that their coatings are nowadays classified as "ablative" since the erosion is not based on a real chemical hydrolysis but rather on a complex process which weakens the surface layer by a combination of dissolving and leaching followed by frictional abrasives forces leading to higher surface roughness (at micron scale ablative pattern) and an irregular erosion rate of the coating.

Systems based on copper (or zinc) acrylates are described in EP 342276 (Nippon Paint), GB 2 311 070 (Kansa iPaint), U.S. Pat. No. 5,545,823 and U.S. Pat. No. 5,382,281 (Yung Chi Paint). Based on cheap raw materials these tin-free systems suffer from several drawbacks. Indeed, their production requires a dedicated equipment and their composition is very difficult to assess by chemical analysis. Further, the use of copper in antifouling systems will certainly be restricted in the forthcoming years. An example of that trend is the Dutch ban on the application of copper-containing antifouling paints on yachts smaller than 25 meters.

Systems based on silyl acrylates were disclosed by M&T (WO 8402915, EP 00131621), and further developed by Chugoku (EP 775733), Nippon Oils & Fats (EP 297505, EP 646630, EP 714957, EP 802243) and Sigma Coatings (WO 0162811 and WO 0162858)

It is known in the art that rosin or rosin derivatives may be used in combination with hydrolysable acrylates in order to improve some of their properties.

EP 530205 (Courtaulds) discloses the use of rosin amine D in combination with copper acrylates.

WO 0043460 (Akzo Nobel) discloses some advantages of using blends of rosin (and its derivatives) with zinc/copper acrylates.

EP 1016681 (Chugoku) discloses that the blending of rosin (and its derivatives) with trialkylsilyl(meth)acrylate co-polymers improve the ability to erode at static conditions (e.g. during the outfitting period in the building of new ships) and by this having a superior antifouling performance. The recoatability and the resistance to cracking and detachment were also claimed to be improved by this blending EP 802243 (Nippon Oils & Fats) discloses blends of at least one compound selected from rosin, rosin derivatives and rosin metal salts with certain polymers containing organosilyl ester groups as binder in self-polishing antifouling paints, leading to improved properties after long-term immersion. Nowadays, the ship owners continue to request an excellent performance over increasingly longer periods of time, in order to reduce the frequency of dry-docking the ships to apply a fresh coating on their hulls. There is thus a continuous need in the art for alternative and improved self-polishing antifouling paint compositions.

The inventor has surprisingly found that the "ablative" effect of the paints, particularly antifouling paints, based on rosin or rosin metal salts could be largely overcome by using silylesters of rosin (alternatively called silylated resinates or silyl abietates).

Thus the present invention provides paint compositions comprising silylesters of rosin in the binder system. Furthermore, the invention provides the use in self-polishing antifouling paints of silylesters of rosin as binder component of the binder system.

For the purpose of this specification, the term "binder system" means a composition consisting essentially of silylesters of rosin and optionally other binder components well known by the man skilled in the art.

The present invention provides also a process for preparing antifouling paints characterised in that one step of the process is the addition of silylesters of rosin as a binder component of the binder system.

The invention is based on the recognition that the properties of antifouling paints containing rosin were insufficient due to the presence of free carboxylic groups on the rosin forming more brittle Zn/Cn resonates said properties being unexpectedly found to be greatly improved after reaction of the free carboxylic group of rosin with a silyl group preferably substituted with hydrocarbyl groups specifically fully substituted with hydrocarbyl groups.

Rosin is a loosely used term, denoting the result of a harvesting of the gum exudations from surface cuts made in certain species of trees. Rosin is sometimes defined restrictively as the product obtained from pines; similar products comprised in the generic term "rosin" as used herein include Congo copal, Kauri copal, Damar and Manilla gums. Other processes for obtaining rosin include dissolving wood rosin from pine stumps after forests have been felled, or refining a by-product of the kraft paper manufacturing process to produce tall oil rosin.

Pine-originating rosin is preferably chosen. The main component (about 80%) of rosin is abietic acid, also called sylvic acid (CAS RN.=514-10-03), which could be used instead of rosin.

The silylester of rosin in this invention can also be a silylester of a rosin derivative.

In the present context, the term "rosin" is intended to include gum rosin; wood rosin of grades B, C, D, E, F, FF, G, H, I, J, K, L, M, N, W-G, W-W (as defined by the ASTM D509 standard); virgin rosin; hard rosin; yellow dip rosin; NF wood rosin; tail oil rosin; or colophony or colophonium; as well as any of the single constituents of natural rosin qualities, e.g., abietic acid, abietinic acid, sylvic acid, dihydroabietic acid, tetrahydroabietic acid, dehydroabietic acid, neoabietic acid, pimaric acid, laevopimaric acid, isopimaric acid, sandaracopimaric acid, palustric acid, dextro-pimaric acid, isodextro-pimaric acid, dextro-pimarinal, isodextro-pimarinal, xanthoperol, tatarol, podocarpic acid, phyllocladen, sugiol, ferruginol, himokiol, manool, manoyloxide, ketomanoyloxide, cativinic acid, eperuanic acid and all other rosin components based on the diterpene skeleton of abietic acid; as well as any mixtures thereof, which have at least one carboxylic acid available for silylation ( via oxidation if necessary). It should be understood that the term "rosin" may indicate any mixtures of the chemical species mentioned above as well as any of the chemical species as such.

In the present context the term "rosin derivative" is intended to mean all types of rosin (as defined above) modified or derivatised according to various chemical reactions or processes which leave at least one carboxylic acid group per molecule available for silylation. A number of processes are expected to lead to rosin derivatives which have superior paint constituent properties with respect to improvement of the mechanical properties and/or control of the self-polishing properties.

As examples, one can cite:
A. the adducts of unsaturated acids (such as acrylic acid, maleic acid or fumaric acid)-and the mono-esters of di-acids with rosin.
B. adducts of rosin itself (dimerised, oligomerised or polymerised rosin)
C. hydrogenated or partially hydrogenated rosin
D. dismutated or disproportionated rosins A more extensive description of rosin and rosin derivatives can be found in WO 9744401 (Hempel's), the contents of which are incorporated herein by reference insofar as they relate to the definition of rosin or rosin derivatives with at least one carboxylic acid group per molecule available for silylation.

Commercially available examples of some rosin and rosin derivatives are given in Table 1. Most of these examples have high softening points and have therefore no adhesive properties.

TABLE 1

Commercially available examples of rosin derivatives.

| Description | Trade name | Company | Acid number | Softening (° C.)# |
|---|---|---|---|---|
| Portuguese gum rosin | (rosin) | Demonchi | 170 | 70 |
| Hydrogenated rosin | Foral AX-E | Hercules | 170 | 80 |
| Dimerized rosin | Dymerex | Hercules | 145 | 150 |
| Partially polymerized rosin | Poly-Pale | Hercules | 140 | 102 |
| Acid modified ester | B106 | Hercules | 200 | 183 |
| Maleic anhydride ester | K1614 | Lawter | 200 | 160 |
| Fumarated rosin | Ennesin FM6 | Lawter | 305 | 140 |

By ring and ball method according to ASTM-E28

The reaction of carboxylic acid groups with substituted silyl groups is well known in the art; see e.g.
  J. D. Nicholson in The Analyst. vol. 103, n°1224, pp 193–222 (March 1978)
  M. Lalonde, T. H. Chan in Synthesis pp 817–845 (September 1985) the contents of which insofar as they relate to the silylation of carboxylic acids groups are incorporated herein by reference.

The preparation and gas chromatography of the trimethylsilyl ester of rosin (CAS RN=21414-50-6) was reported (J. Gas Chromatogr. 1968, 6 (3) 158–160).

Examples of silylating agents are triorganosilyl chlorides and hydrides, and hexaorgano disiloxanes and disilazanes:
$R_1R_2R_3Si$—X with X=H or Cl
$R_1R_2R_3Si$—X—Si $R_4R_5R_6$ with X=O or NH According to the invention, the silyl radical may be substituted or unsubstituted. Suitable silyl substituents are one or more alkyl, aralkyl or aryl radicals, which may be the same or different, including methyl, ethyl, n-propyl, isopropyl, n-butyl, isobutyl, t-butyl and phenyl. An example of a silylating agent with different substituents is dimethyl t-butyl silyl chloride. The preferred substituents are methyl and ethyl, the more preferred substituent being methyl.

The term "alkyl", as used herein, relates to saturated hydrocarbon radicals having straight, branched or cyclic moieties or combinations thereof and contains 1 to 20 carbon atoms, preferably 1 to 10 carbon atoms, more preferably 1 to 8 carbon atoms, still more preferably 1 to 6 carbon atoms, yet more preferably 1 to 4 carbon atoms. Examples of such radicals include methyl, ethyl, n-propyl, isopropyl n-butyl, isobutyl, sec-butyl, tert-butyl, 2-methylbutyl, pentyl, iso-amyl, hexyl, cyclohexyl, 3-methylpentyl, octyl and the like.

The term "aryl" as used herein, relates to an organic radical derived from an aromatic hydrocarbon by removal of one hydrogen, and includes any monocyclic or bicyclic carbon ring of up to 7 members in each ring, wherein at least one ring is aromatic. Said radical may be optionally-substituted with one or more substituents independently selected from alkyl, alkoxy, halogen, hydroxy or amino radicals. Examples of aryl includes phenyl, p-tolyl, 4-methoxyphenyl, 4-(tert-butoxy)phenyl, 3-methyl-4-methoxyphenyl, 4-fluorophenyl, 4-chlorophenyl, 3-nitrophenyl, 3-aminophenyl, 3-acetamidophenyl, 4-acetamidophenyl, 2-methyl-3-acetamidophenyl, 2-methyl-3-aminophenyl, 3-methyl-4-aminophenyl, 2-amino-3-methylphenyl, 2,4-dimethyl-3-aminophenyl, 4-hydroxyphenyl, 3-methyl-4-hydroxyphenyl, 1-naphthyl, 2-naphthyl, 3-amino-1-naphthyl, 2-methyl-3-amino-1 -naphthyl, 6-amino-2-naphthyl, 4,6-dimethoxy-2-naphthyl, tetrahydronaphthyl, indanyl, biphenyl, phenanthryl, anthryl or acenaphthyl and the like.

The term "aralkyl" as used herein, relates to a group of the formula alkyl-aryl, in which alkyl and aryl have the same meaning as defined above.

Examples of aralkyl radicals include benzyl, phenethyl, dibenzylmethyl, methylphenylmethyl, 3-(2-naphthyl)-butyl, and the like.

According to another preferred embodiment, di-, tri-, tetrafunctional silylating agents and mixtures thereof can also be used, for example dimethylsilyl dichloride, ethylsilyl trichloride and tetrachlorosilane, to obtain respectively dialkylsilyl diresinate, alkylsilyl triresinate, silyl tetraresinate and mixtures thereof.

An object of the present invention is a paint composition or the use in paints, preferably antifouling paints of silylesters of rosin as binder component of the binder system wherein the silylesters of rosin are in an amount of from 5 to 100% by weight, based on the total weight of the binder system composition.

According to an embodiment, the silylesters of rosin are in an amount of from 5 to 25% by weight, based on the total weight of the binder system composition.

According to another embodiment, the silylesters of rosin are in an amount of from 35 to 65% by weight, based on the total weight of the binder system composition.

According to yet another embodiment, the silylesters of rosin are in an amount of 100% by weight, based on the total weight of the binder system composition.

The inventor has now surprisingly found that the complete conversion of the acid functionality of rosin compounds into a silylester has many advantages for paint formulation, manufacturing and stability by providing a silyl ester that is:

Inert to reactive pigments such as zinc oxide and cuprous oxide. It is well known that self-polishing antifouling paints containing rosin compounds react through their free acid functionality with reactive pigments, in practice always present in antifouling paints, such as zinc oxide or cuprous oxide, to form the corresponding salts e.g. zinc resinate or cuprous resinate. The metal salts of resinates have the disadvantage of being hardly soluble in seawater and having poor adhesive and film forming properties.

Inert to biocides. There is for example no more risk of gelation that usually occurs when zinc/copper pyrithione is used in rosin-based formulations. It is well known that zinc pyrithione is one of the modern biocides used in antifouling paints but that it has the disadvantage of being unstable in the presence of carboxylic acid groups and/or the metal salts of carboxylic acid groups. This biocide can therefore e.g. not without special precautions be used in rosin-based paints because they always do contain carboxylic acid groups to some extent which lead to an irreversible gelation of the paint.

More sensitive to dissolving and erosion processes in water (fresh water or seawater).

Less brittle; in other words having a lower glass transition temperature (Tg) and softening point than corresponding metal salts of the resinate species concerned.

Indeed, whilst the reaction of rosin compounds with zinc oxide or cuprous oxide has the effect of increasing the softening point and the Tg as well, e.g. softening point from 70° C. for rosin to 160° C. for zinc resinate. In contrast there is hardly an increase when the acid function of rosin compounds has reacted with a silyl group according to the invention (e.g. Tg value's in example 1 of from 52° C. for rosin to only 62° C. for trimethylsilyl resinate).

The hydrolysable silylesters of rosin can be used as sole resin or preferably in combination with other binders, to form a binder system, that are commonly present in antifouling formulations. When other binders are present, those are in an amount of from more than 0 up to 95% by weight, based on the total weight of the binder system composition.

However, the silylesters of rosin of the present invention may be used in non-antifouling paint compositions. For example, the self-polishing effect may be used in other compositions such as "anti-graffiti" paint compositions.

Examples of other binders are:

Resinates of Ca, Cu or Zn

Naphthenates of Ca, Cu, Zn

Vinyls like Laroflex MP (commercially available from BASF)

Acrylates like Neocryl B725 (commercially available from Avecia)

Cu/Zn/Ca acrylates, e.g. as described in EP 342276; EP 982324 (Kansai) or polyesters e.g. as described in EP 1033392 (Kansai).

Tri-organosilyl(meth)acrylates copolymers as described e.g. in EP 131626 (M&T); U.S. Pat. No. 4,593,055 (M&T); EP 775773 (Chugoku); EP 646630 (NOF); U.S. Pat. No. 5,436,284 (NOF); WO 0162811 and WO 0162858 (SIGMA COATINGS).

Hydrophilic (meth) acrylates such as e.g. described in FR 2 557 585 (Jotun), EP 526441 and EP 289441 (SIGMA COATINGS). It has been observed that blends of the hydrophilic acrylic resins such as described in EP 526441 and EP 289441 with a silylester of rosin had improved 25 properties over blends with zinc resinate. The film was more flexible, had better adhesive properties and showed a hydrolysis-driven erosion process at pH 12 while not showing defects upon immersion in fresh and sea water conditions (pH 7 and 8 respectively).

The present invention also provides for antifouling paints containing as components:

one or more antifoulants.

Antifoulants although not essential to the present invention may be used as a component in the coating composition of the present invention and may be any of one or more conventionally known antifoulants. The known antifoulants are roughly divided into inorganic compounds, metal-containing organic compounds, and metal-free organic compounds.

Examples of the inorganic compounds include copper compounds (e.g. copper sulphate, copper powder, cuprous thiocyanate, copper carbonate, copper chloride, and the traditionally preferred cuprous oxide), zinc sulphate, zinc oxide, nickel sulphate, and copper nickel alloys.

Examples of the metal-containing organic compounds include organo-copper compounds, organo-nickel compounds, and organo-zinc compounds. Also usable are manganese ethylene bis dithiocarbamate (maneb), propineb, and the like. Examples of the organo-copper compounds include copper nonylphenol-sulphonate, copper bis(ethylenediamine)bis(dodecylbenzenesulphonate), copper acetate, copper naphtenate, copper pyrithione and copper bis(pentachlorophenolate). Examples of the organo-nickel compounds include nickel acetate and nickel dimethyldithiocarbamate. Examples of the organo-zinc compounds include zinc acetate, zinc carbamate, bis(dimethylcarbamoyl)zinc ethylene-bis(dithiocarbamate), zinc dimethyldithiocarbamate, zinc pyrithione, and zinc ethylene-bis(dithiocarbamate). As an example of mixed metal-containing organic compound, one can cite (polymeric) manganese ethylene bis dithiocarbamate complexed with zinc salt (mancozeb).

Examples of the metal-free organic compounds include N-trihalomethylthiophthalimides, trihalomethylthiosulphamides, dithiocarbamic acids, N-arylmaleimides, 3-(substituted amino)-1,3 thiazolidine-2,4-diones, dithiocyano compounds, triazine compounds, oxathiazines and others.

Examples of the N-trihalomethylthiophthalimides include N-trichloromethylthiophthalimide and N-fluorodichloromethylthiophthalimide.

Examples of the dithiocarbamic acids include bis(dimethylthiocarbamoyl) disulphide, ammonium N-methyldithiocarbamate and ammonium ethylene-bis(dithiocarbamate).

Examples of trihalomethylthiosulphamides include N-(dichlorofluoromethylthio)-N',N'-dimethyl-N-phenylsulphamide and N-(dichlorofluoromethylthio)-N',N'-dimethyl-N-(4-methylphenyl)sulphamide.

Examples of the N-arylmaleimides include N-(2,4,6-trichlorophenyl)maleimide, N-4 tolylmaleimide, N-3 chlorophenylmaleimide, N-(4-n-butylphenyl)maleimide, N-(anilinophenyl)maleimide, and N-(2,3-xylyl)maleimide.

Examples of the 3-(substituted amino)-1,3-thiazolidine-2,4-diones include 2-(thiocyanomethylthio)benzothiazole, 3-benzylideneamino-1,3-thiazolidine-2,4-dione, 3-(4-methylbenzylideneamino)-1,3-thiazolidine-2,4-dione, 3-(2-hydroxybenzylideneamino)-1,3-thiazolidine-2,4-dione,3-(4-dimethylaminobenzylideamino)-1,3-thiazolidine-2,4-dione, and 3-(2,4-dichlorobenzylideneamino)-1,3-thiazolidine-2,4-dione.

Examples of the dithiocyano compounds include dithiocyanomethane, dithiocyanoethane, and 2,5-dithiocyanothiophene.

Examples of the triazine compounds include 2-methylthio-4-butylamino-6-cyclopropylamino-s-triazine.

Examples of oxathiazines include 1,4,2-oxathiazines and their mono- and di-oxides such as disclosed in PCT patent WO 98/05719: mono- and di-oxides of 1,4,2-oxathiazines with a substituent in the 3 position representing (a) phenyl; phenyl substituted with 1 to 3 substituents independently selected from hydroxyl, halo, C1–12 alkyl, C5–6 cycloalkyl, trihalomethyl, phenyl, C1–C5 alkoxy, C1–5 alkylthio, tetrahydropyranyloxy, phenoxy, C1–4 alkylcarbonyl, phenylcarbonyl, C1–4 alkylsulfinyl, carboxy or its alkali metal salt, C1–4 alkoxycarbonyl, C1–4 alkylaminocarbonyl, phenylaminocarbonyl, tolylaminocarbonyl, morpholinocarbonyl, amino, nitro, cyano, dioxolanyl or C1–4 alkyloxyiminomethyl; naphtyl; pyridinyl; thienyl; furanyl; or thienyl or furanyl substituted with one to three substituents independently selected from C1–C4 alkyl, C1–4 alkyloxy, C1–4 alkylthio, halo, cyano, formyl, acetyl, benzoyl, nitro, C1–C4 alkyloxycarbonyl, phenyl, phenylaminocarbonyl and C1–4 alkyloxyiminomethyl; or (b) a substituent of generic formula

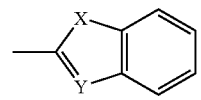

wherein X is oxygen or sulphur; Y is nitrogen, CH or C(C1–4 alkoxy); and the C6 ring may have one C1–4 alkyl substituent; a second substituent selected from C1–4 alkyl or benzyl being optionally present in position 5 or 6.

Other examples of the metal-free organic compounds include 2,4,5,6-tetrachloroisophthalonitrile, N,N-dimethyl-dichlorophenylurea, 4,5-dichloro-2-n-octyl-4-isothiazoline-3-one, N,N-dimethyl-N'-phenyl-(N-fluorodichloromethylthio)-sulfamide, tetramethylthiuramdisulphide, 3-iodo-2-propynylbutyl carbamate, 2-(methoxycarbonylamino) benzimidazole, 2,3,5,6-tetrachloro4-(methylsulphonyl) pyridine, diiodomethyl-p-tolyl sulphone, phenyl (bispyridine)bismuth dichloride, 2-(4-thiazolyl) benzimidazole, dihydroabietyl amine, N-methylol formamide and pyridine triphenylborane.

According to a preferred embodiment, the use as antifoulant of the oxathiazines disclosed in WO-A-9505739 has the added advantage (disclosed in EP-A-823462) of increasing the self-polishing properties of the paint.

Among the fouling organisms, barnacles have proved to be the most troublesome, because they resist to most biocides. Accordingly, the paint formulation should preferably include at least an effective amount of at least one barnaclecide, such as cuprous oxide or thiocyanate. A preferred barnaclecide is disclosed in EP-A-831134. EP-A-831134 discloses the use of from 0.5 to 9.9 wt %, based on the total weight of the dry mass of the composition, of at least one 2-trihalogenomethyl-3-halogeno-4-cyano pyrrole derivative substituted in position 5 and optionally in position 1, the halogens in positions 2 and 3 being independently selected from the group consisting of fluorine, chlorine and bromine, the substituent in position 5 being selected from the group consisting of C1–8 alkyl, C1–8 monohalogenoalkyl, C5–6 cycloalkyl, C5–6 monohalogenocycloalkyl, benzyl, phenyl, mono- and di-halogenobenzyl, mono- and di-halogenophenyl, mono- and di-C1–4-alkyl benzyl, mono- and di-C1–4-alkyl phenyl, monohalogeno mono-C1–4-alkyl benzyl and monohalogeno mono-C1–4-alkyl phenyl, any halogen on the substituent in position 5 being selected from the group consisting of chlorine and bromine, the optional substituent in position I being seclected from C1–4 alkyl and C1–4 alkoxy C1–4 alkyl.

One or more antifoulants selected from such antifoulants are employed in the present invention. The antifoulants are used in such an amount that the proportion thereof in the solid contents of the coating composition is usually from 0.1 to 90% by weight, preferably 0.1 to 80% by weight, and more preferably from 1 to 60% by weight. Too small antifoulant amounts do not produce an antifouling effect, while too large antifoulant amounts result in the formation of a coating film which is apt to develop defects such as cracking and peeling and thus becomes less effective in antifouling property.

The paint may further contains pigment(s) (or fillers), solvent(s) and additive(s).

The paint composition can contain one or more pigments which are "active" pigments, i.e. sparingly soluble in seawater. These pigments have a sea water solubility such that the pigment particles do not survive at the paint surface. These pigments have the effect of inducing the overall smoothing which the relatively-moving seawater exerts on the paint film, minimising localised erosion and preferentially removing excrescences formed during the application of the paint. Sparingly soluble pigments have long been used in self-polishing antifouling paints. Typical examples are cuprous thiocyanate, cuprous oxide, zinc oxide, cupric acetate meta-arsenate, zinc chromate, zinc dimethyl dithiocarbamate, zinc ethylene bis(dithiocarbamate) and zinc diethyl dithiocarbamate. The preferred sparingly soluble pigments are zinc oxide, cuprous oxide and cuprous thiocyanate. Mixtures of sparingly soluble pigments can be used, e.g. zinc oxide, which is most effective at inducing the gradual dissolution of the paint, can be mixed with cuprous oxide, cuprous thiocyanate, zinc dimethyl or diethyl dithiocarbamate, or zinc ethylene bis-(dithiocarbamate) which are more effective marine biocides; the most preferred is a mixture of zinc oxide with cuprous oxide or thiocyanate.

The paint composition can contain one or more pigments that are highly insoluble in seawater, such as titanium dioxide, talc or ferric oxide. Such highly insoluble pigments can be used at up to 40 percent by weight of the total pigment component of the paint. Highly insoluble pigments have the effect of retarding the erosion of the paint.

The paint composition can contain one or more pigments or dyes that impart a colour to the paint, e.g. titanium dioxide, cuprous oxide or iron oxide.

The proportion of pigment to polymer is preferably such as to give a pigment volume concentration of at least 25 percent, more preferably at least 35 percent, in the dry paint film. The upper limit of pigment concentration is the critical pigment volume concentration. Paints having pigment volume concentrations of up to about 50 percent, for example, have been found very effective in marine applications.

Examples of the organic solvent include aromatic hydrocarbons such as xylene and toluene; aliphatic hydrocarbons such as hexane and heptane, esters such as ethyl acetate and butyl acetate; amides such as N-methylpyrrolidone and N,N-dimethylformamide; alcohols such as isopropyl alcohol and butyl alcohol; ethers such as dioxane, THF and diethyl ether; and ketones such as methyl ethyl ketone, methyl isobutyl ketone and methyl isoamyl ketone. The solvent may be used alone or in combination thereof.

Solvents are used to obtain the desired viscosity. In marine applications, the viscosity is selected to be at the expected operating temperature for the application on the ship hull, preferably in the range of 5–50 dPa.s, more preferably of 10–20 dPa.s, most preferably of about 15 dPa.s. Obviously, in marine applications (either freshwater or seawater) the nature of the solvents is also adapted to the expected operating temperature for the application on the ship hull, taking into account the desired drying time.

Additive ingredients may optionally be incorporated into the coating composition of the present invention thus prepared. Examples of the additive ingredients are dehumidifiers, and additives ordinarily employed in coating compositions as anti-sagging agents, anti-flooding agents, thixotropic and anti-settling agents, stabilisers and anti-foaming agents.

The following non-limiting examples illustrate the invention. The measuring methods used in the examples are given further.

EXAMPLE 1

Synthesis of Trimethylsilyl Resinate 420 g Portugese gum rosin was put in a 2-L 4-necked flask and kept under nitrogen. The four necks of the flask were equipped with stirring means, a reflux cooler, a thermometer for temperature control of the reaction, and means for addition of the reactants. The gum rosin was dissolved in a solvent mixture of 218 g xylene and 850 g toluene. Thereafter 128 grams tri-ethylamine was carefully added over 5 minutes under vigorous stirring. As a consequence the temperature of the contents of the flask rose by 10° C. The addition of the tri-ethyl amine was followed by the slow addition of 138 g trimethylsilyl chloride under vigorous stirring.

A white salt was instantaneously formed and the exothermic reaction made the contents rise to a temperature of 50° C. The reaction mixture was kept at a temperature of 50° C. for 5 hours. Then the heating and the stirring was stopped. The next day the formed trimethylsilyl resinate was purified by filtration and evaporation of the toluene solvent fraction. The yield was 530 g (circa 78%) of a brown colored solution, that was 75 wt % in solids and had a viscosity of 3 dpa.s. The binder was very flexible and had a good adhesion on glass and epoxy primer and showed hydrolysis within minutes upon immersion in an alkaline solution of pH 12. This is in contrast with zinc resinate which had a hard and brittle film with moderate adhesion on glass and without showing any hydrolysis behavior up to pH 13. The binder had a Tg of 62° C.

EXAMPLE 2

Synthesis of Dimethylsilyldiresinate

The same equipment and procedures were used as for the synthesis of example 1 with the following differences:

335 g Portugese gum rosin had been dissolved in 121 g xylene and 500 g toluene.

To this had been added consecutively 101 g tri-ethyl amine and 64,5 g dimethyldichlorosilane.

The yield was 300 g of a brown colored solution that was 70 wt % in solids and had a viscosity of 10 dPa.s.

The binder had a good adhesion on glass and epoxy primers.

The binder was very sensitive to alkaline hydrolysis. A binder film dissolved in water of pH 12 completely within 15 minutes.

The binder had a Tg of 52° C.

Some properties of trimethylsilyl resinate and dimethylsilyl diresinate are specified in table 2.

Examples 1 and 2 demonstrate that silylesters of resinates dissolve in alkaline solutions more quickly than for example zinc resinate and that they are less brittle than zinc resinate.

TABLE 2

| Parameter | Trimethylsilylresinate (ex 1) | Dimethylsilyldiresinate (ex 2) | Zinc Resinate | Rosin |
|---|---|---|---|---|
| Tg (° C.) | 62 | 52 | 160 | 52 |
| Dissolving (at pH) | Yes (pH 12) | Yes (pH 12) | No (pH 13) | Yes (pH 12) |

PAINT FORMULAS

EXAMPLES 3 TO 6 AND COMPARATIVE EXAMPLE A

Several paints were prepared whose composition by weight is given in Table 3.

TABLE 3

Paint compositions

| | | Example | | | | |
|---|---|---|---|---|---|---|
| Ingredients | Description | 3 wt % | 4 wt % | 5 wt % | 6 Wt % | A wt % |
| TrimethylSiresinate | 75 wt % in xylene (ex. 1) | 24.1 | | | | |
| DimethylSidiresinate | 70 wt % in xylene (ex. 2) | | 27.5 | 12.5 | 2.5 | |
| 50MA/25VP/25BA | | | | 17.4 | | 17.4 |
| Zinc resinate | Erkacit 250 | | | | 10.9 | 8.7 |
| Laroflex MP 45 | Vinylchloride (BASF) | | | | 4.9 | |
| Thix. Agents | | 1.3 | 1.4 | 1.3 | 1.3 | 1.3 |
| Cuprous oxide | | 40.2 | 42.1 | 38.4 | 38.4 | 38.5 |
| Zinc oxide | | 15.0 | 7.9 | 14.3 | 14.3 | 14.4 |
| Iron oxide | | 6.7 | 7.0 | 6.4 | 6.4 | 6.4 |
| Zinc pyrithione | Zinc Omadine (Arch) | | 2.8 | | | |
| Xylene | | 12.6 | 11.2 | 9.7 | 21.3 | 13.3 |
| Total | | 100.0 | 100.0 | 100.0 | 100.0 | 100.0 |

In Example 5 and Comparative Example A, there was used a solution (50 wt % in xylene) of resin 50MA/25VP/25BA according to example 1 of EP-A-526 441, having the monomer weight composition 50% methyl acrylate, 25% vinyl pyrrolidone and 25% butyl acrylate. In Comparative Example A, there was used zinc resinate.

The amount by weight of the silylesters of rosin, based on the total weight of the binder system, used in the several paint formulas is given in table 4

TABLE 4

| Ingredients | 3 wt % | 4 wt % | 5 wt % | 6 wt % | A wt % |
|---|---|---|---|---|---|
| TrimethylSiresinate | 100 | | | | — |
| DimethylSidiresinate | | 100 | 50.1 | 10 | — |

Properties of the paints are presented in Table 5.

TABLE 5

Paint properties

| Properties | Units (parameters) | 3 | 4 | 5 | 6 | A |
|---|---|---|---|---|---|---|
| Viscosity | dPa · s | 12 | 15 | 13 | 15 | 11 |
| Can Stability | (3 months; 20° C.) | ok | ok | ok | Ok | ok |
| Erosion rate | μm/month (average during 12 months) | 7 | 12 | 5 | 4 | 3 |
| Fouling (1 season) | % (fouled area) | 0 | 0 | 0 | 3% | 10% |

None of the paint formulas showed any significant rise in viscosity after 3 months storage at 20° C.

The paints have been tested for antifouling activity and erosion rate.

Paints according to the invention present outstanding antifouling and self-polishing properties.

No significant weed or animal fouling has been observed on the panels coated with the paints according to the invention and the algal slime was practically non-existent.

Measuring methods used in the examples are as follows:

Determination of the Solids Content

The solids content was determined by weighing before and after heating a sample for 1 hour at 120° C. [standard test methods ISO 3233/ASTM 2697/DIN 53219].

Determination of the Viscosity

The viscosity of binder solutions and of paints was determined with a Brookfield at 25° C. [ASTM test method D2196-86].

The viscosity of paints had been adjusted between 10 and 20 dPa.s. with xylene. The viscosity was measured using a Haake VT 181 (body E30 or 100) viscosimeter under standard conditions.

Evaluation of the Hydrolysability of the Binders

The hydrolysability has been evaluated by dipping drawdowns in an alkaline solution (NaOH, pH 12.0–13.4). Hydrolysablitiy is reported as "yes" at a certain pH when hydrolysis or complete dissolving of a film (50–100 μm) could be observed within one hour.

Determination of the Softening Point

The ring and ball method according ASTM-E28 was used.

Determination of the Tg of the Binders

Samples for the actual determination were made by making draw downs of the resins on glass and drying for 16 hours at 120° C. Here after the measurements had been carried out with a differential scanning apparatus of TA instruments, DSC10 according ASTM 3418.

Evaluation of the Polishing of Paints

The erosion rate is the average decrease in film thickness (expressed in μm/month) per month over the whole test.

Stainless steels discs, 20 cm in diameter, were protected with a standard anti-corrosive system (300 μm in dry film thickness). Two layers of the self-polishing paint to be tested were applied, to give a total dry film thickness between 200 and 300 μm. The tests were carried out in constantly refreshed natural seawater, at a constant temperature of 20°

C. The discs were rotated at 1000 rpm, corresponding to about 34 km/h (18 knots) at 9 cm from the center.

The total dry film thickness was determined at 2 monthly intervals, after allowing the paint to dry during one day. It was measured at a number of fixed points, each located at 9 cm from the center of the discs.

The Evaluation of the Antifouling Activity of the Paints.

The antifouling activity was tested by applying the prepared paints to a plaque over a vinyl resins/tar anti-corrosive paint, mounting the plaque on a panel and immersing the panel from a raft in a river estuary off the Southern Netherlands during the active season (March→October). Each test also included plaques coated with a non-toxic control (which became heavily fouled with seaweed and some animal life within 4 weeks). The fouling rate is reported by stating the area covered with fouling.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A paint composition comprising silylesters of rosin, wherein the composition comprises one or more antifoulants.

2. A composition according to claim 1, wherein the silylesters of rosin are selected from the group consisting of trialkylsilyl monoresinate, dialkylsilyl diresinate, alkylsilyl triresinate, silyl tetraresinate and mixtures thereof.

3. A composition according to claim 2, wherein the silyl alkyl substituents are selected from the group consisting of methyl, ethyl, n-propyl, isopropyl n-butyl, isobutyl, t-butyl and phenyl substituents and mixtures thereof.

4. A composition according to claim 3, wherein the silyl alkyl substituents are selected from the group consisting of methyl and ethyl substituents and mixtures thereof.

5. A composition according to claim 4, wherein the silyl alkyl substituents are methyl substituents.

6. A paint composition comprising a binder system, the said binder system comprising silylesters of rosin as a binder component, wherein the composition comprises one or more antifoulants.

7. A composition according to claim 6, wherein the silylesters of rosin are in an amount of from about 5 to about 100% by weight, based on the total weight of the binder system.

8. A composition according to claim 6, wherein silylesters of rosin are used in combination with other binder components.

9. A process for preparing a paint composition according to claim 6 comprising a step of adding silylesters of rosin as a binder component of a binder system, and adding one or more antifoulants.

10. A composition according to claim 6, wherein the silylesters of rosin are selected from the group consisting of trialkylsilyl monoresinate, dialkylsilyl diresinate, alkylsilyl triresinate, silyl tetraresinate and mixtures thereof.

11. A composition according to claim 10, wherein the silyl alkyl substituents are selected from the group consisting of methyl, ethyl, n-propyl, isopropyl n-butyl, isobutyl, t-butyl and phenyl substituents and mixtures thereof.

12. A composition according to claim 11, wherein the silyl alkyl substituents are selected from the group consisting of methyl end ethyl substituents and mixtures thereof.

13. A composition according to claim 12, wherein the silyl alkyl substituents are methyl substituents.

* * * * *